Figure 1:
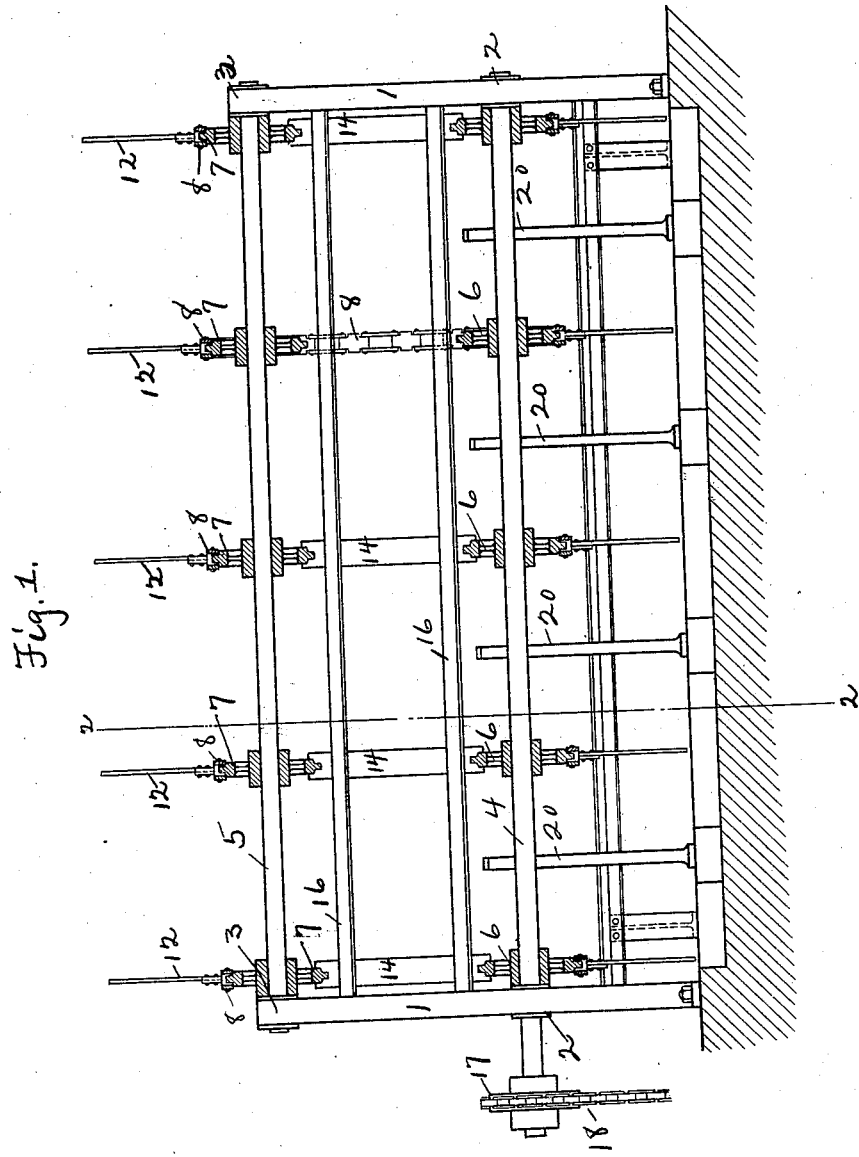

W. ALTMAN.
COOLING CONVEYER.
APPLICATION FILED JAN. 27, 1908.

903,148.

Patented Nov. 3, 1908.
2 SHEETS—SHEET 1.

WITNESSES
K. R. Kane.
J. D. McLaughlin

INVENTOR
Walter Altman
by N. C. Lord
ATTORNEY

W. ALTMAN.
COOLING CONVEYER.
APPLICATION FILED JAN. 27, 1908.
903,148.
Patented Nov. 3, 1908.
2 SHEETS—SHEET 2.
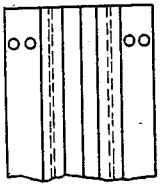
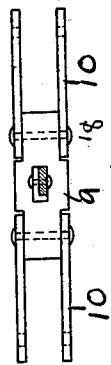
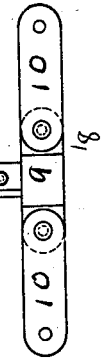
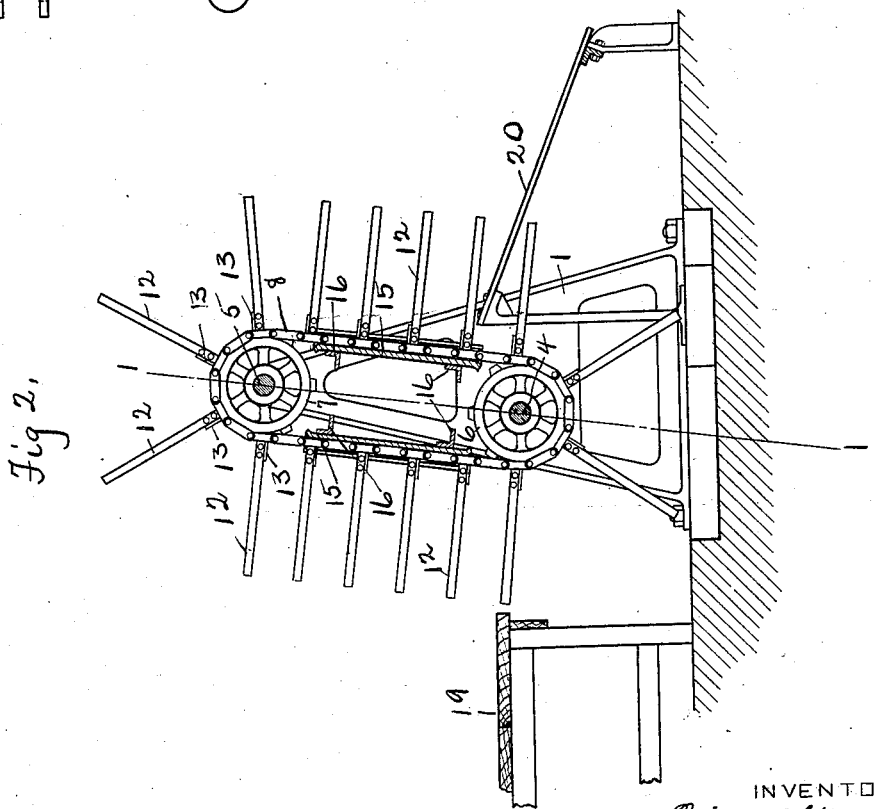
WITNESSES
INVENTOR
ATTORNEY

UNITED STATES PATENT OFFICE.

WILBUR ALTMAN, OF ERIE, PENNSYLVANIA, ASSIGNOR TO ERIE FOUNDRY COMPANY, OF ERIE, PENNSYLVANIA, A CORPORATION OF PENNSYLVANIA.

COOLING-CONVEYER.

No. 903,148.     Specification of Letters Patent.     Patented Nov. 3, 1908.

Application filed January 27, 1908. Serial No. 412,906.

*To all whom it may concern:*

Be it known that I, WILBUR ALTMAN, a citizen of the United States, residing at Erie, in the county of Erie and State of Pennsylvania, have invented new and useful Improvements in Cooling-Conveyers, of which the following is a specification.

This invention relates to cooling conveyers, and consists in certain improvements in the construction thereof as will be hereinafter fully described and pointed out in the claim.

The cooling conveyer shown is particularly adapted for conveying and cooling galvanized or tin plates, although it may be utilized for other purposes.

The invention is illustrated in the accompanying drawings as follows:

Figure 1 shows a section on the line 1—1 in Fig. 2. Fig. 2 a section on the line 2—2 in Fig. 1. Fig. 3 a front view of a fragment of a conveyer chain. Fig. 4 a side elevation of the same. Fig. 5 a plan view of the conveyer chain guide. Fig. 6 a front view of the same.

1—1 mark the side frames of the machine. These frames are provided with the bearings 2 and 3, the bearings 3 being above the bearings 2. A shaft 4 is journaled in the bearings 2, and a similar shaft 5 is journaled in the bearings 3. A series of sprocket wheels 6 are fixed on the shaft 4, and a like series of wheels 7 are arranged in the shaft 5.

The conveyer chains 8 are arranged on these sprocket wheels. They are made of the solid blocks 9 and links 10 at each side of the blocks 9. The blocks 9 have the projecting supporting brackets 11, and the conveyer supports 12 are secured to these brackets by means of the rivets 13, or otherwise.

The guides 14 have the under cut grooves 15 through which the chains may pass both on the up and down sides of the machine. These chain guides are secured on the angle irons 16 extending across the machine from side frame to side frame.

The shaft 4 is provided with a sprocket wheel 17, and a chain 18 operates this sprocket wheel for driving the conveyer. The sprocket wheels 6 and 7 are of uniform size, so that the chains all operate at uniform speed, and the same links therein have exact alinement, so that the supports 12 form platforms upon which material such as tin plates may be placed.

A table 19 is arranged on the side of the machine on which the supports move upwardly, which side of the machine may be termed the up side of the machine, and the plates are placed upon the platforms formed by the supports carried upwardly and over the wheels 7 to the down side of the machine, the plates dropping from one platform of the supports to the one beneath it.

At the lower side of the down side of the machine are arranged a series of inclined receiving bars 20. These extend between the supports 12 so as to be in a path of the plates upon the supports. As the plate reaches these receiving bars, it is tilted by them and slides off.

It will be noted that the axes of the conveyer wheels are arranged one above another, and that the supports project from the conveyer chains or flexible carrier in such direction, that material is retained upon the supports on the down side of the machine as well as on the up side of the machine.

It will be noted also, that the conveyer may be extended upwardly indefinitely without materially increasing the floor space occupied by it. In this way the plates carried by it may be more thoroughly cooled, and if it is necessary it may be extended, so as to increase its capacity, it being evident, that if its length were double it would have double the capacity giving each plate the same intervals for cooling.

What I claim as new is:

In a cooling conveyer, the combination of an endless flexible carrier; wheels for supporting said carrier; and supports extending from said carrier and forming platforms, the axes of the wheels being arranged one above the other, and the support having a direction relatively to the carrier to retain material thereon both on the up and down sides of the conveyer, the direction of the supports relatively to the carrier remaining constant and the platforms formed by the supports having an uninterrupted path from the bottom of one side of the conveyer to the bottom of the opposite side of the conveyer, whereby a plate will be carried up one side of the conveyer, dropped as the carrier
5 passes over the upper wheels to the preceding platform and conveyed thereby down the down side of the conveyer.

In testimony whereof I have hereunto set my hand in the presence of two subscribing witnesses.

WILBUR ALTMAN.

Witnesses:
  H. C. LORD,
  K. R. KANE.